Feb. 14, 1961  G. A. GIBSON, JR  2,971,415
APPARATUS FOR FEEDING, CUTTING AND STACKING FLAT STOCK
Filed July 7, 1954  10 Sheets-Sheet 1

INVENTOR.
GEORGE A. GIBSON, JR.
BY
Morgan, Finnegan, Durham & Pine
ATTORNEYS.

Feb. 14, 1961 G. A. GIBSON, JR 2,971,415
APPARATUS FOR FEEDING, CUTTING AND STACKING FLAT STOCK
Filed July 7, 1954 10 Sheets-Sheet 6

INVENTOR.
GEORGE A. GIBSON, JR.
BY
Morgan, Finnegan, Durham & Pine
ATTORNEYS.

United States Patent Office 2,971,415
Patented Feb. 14, 1961

2,971,415
APPARATUS FOR FEEDING, CUTTING AND STACKING FLAT STOCK

George A. Gibson, Jr., New York, N.Y.
(165 Clymer St., Brooklyn 11, N.Y.)

Filed July 7, 1954, Ser. No. 441,820

28 Claims. (Cl. 83—94)

The present invention relates to apparatus for feeding, cutting and stacking articles of a flat nature such as paper, cards, or the like.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The invention comprises apparatus for feeding and forwarding flat articles such as paper, cards, or the like, which may be either ornamented or unornamented at the time of forwarding, in a predetermined position to cutting or slitting means whereby the flat articles are cut into segments and then passed to a stacking apparatus which neatly stacks the segments into separate piles. The device herein shown and described for purposes of illustration may, for example, be adapted to receive printed or embossed card stock through a supply means, said stock being in the form of flat rectangular sheets, and to forward said sheets to a cutting mechanism which will cut each sheet into a plurality of relatively long and narrow rectangular units which are suitable to be further processed into finished cards by spaced cuts lengthwise of each unit. The preferred embodiment of the apparatus illustrated in the accompanying drawings and described in the specification is adapted for fully automatic operation, in which each of the individual operations is performed by the apparatus automatically and in rapid sequence, but manually operable controls are provided by which certain operations may be carried out by the operator.

The illustrative form of the invention shown and described preferably comprises three major sections or components. A feeding mechanism, preferably located at the front of the apparatus, is provided whereby the sheets of flat stock are individually removed from a pile and inserted into a conveying or forwarding mechanism. The conveying mechanism forwards the sheets to a cutting or slitting means, properly aligning the sheets with respect to the cutting means during the operation. In passing through the cutting means the sheets are cut into a plurality of segments and then introduced ino a stacking apparatus which guides the segments into neatly stacked piles.

The feeding mechanism comprises supporting means for holding a supply of flat articles, such as sheets of flat paper stock, said means being movable so as to bring successive sheets of flat articles to a position from which they may be inserted into the conveying mechanism. The feeding mechanism is also provided with transfer means for lifting the sheets off the top of the pile and inserting them into the conveying mechanism. As embodied, the transfer mechanism comprises apparatus for separating the several sheets adjacent the top of the pile, gripping means to lift the top sheet off the pile and carrying means for moving the top sheet out from underneath a restraining member and for inserting the sheet into the conveying mechanism. The feeding mechanism is also provided with automatic regulating means by which the travel of the supporting means toward the transfer means is controlled in accordance with the decrease in the height of the pile of flat sheets. Adjusting mechanisms are also provided by which the pitch of the pile of flat sheets on the movable platform may be selectively varied.

The conveying mechanism preferably is similar in construction to the conveying mechanism disclosed in my patent for Conveying and Registering Mechanism of April 6, 1954, No. 2,674,456, and comprises suitable roller elements located adjacent the transfer means in the feeding mechanism to receive the top sheet off the pile of flat articles from the transfer means. Additional roller elements are also provided in the conveying mechanism by which the flat sheet is forwarded from the first roller elements to cutting or slitting means, said roller elements being adapted to correctly register the sheet in motion with respect to the cutting means so that the sheet will enter the cutting means in a predetermined position.

The stacking means by which the cutting segments are divided and neatly piled comprises supporting means for the segments adapted to be lowered at the same rate as the supporting means for the feednig mechanism whereby the tops of the piles of segments are maintained at substantially the same level at all times. In addition, the stacking mechanism is provided with separating means which separate the individual segments and which guide and maintain the segments into neatly stacked individual piles.

All of the aforementioned mechanisms are constructed so as to be fully automatic but suitable hand actuating means are also provided by which the supporting means for the feeding and stacking mechanisms may be operated manually whenever desired.

It will be understood that the foregoing general description and the following detailed description as well are exemplary and explanatory of the invention but are not intended to be restrictive thereof.

Figure 1:
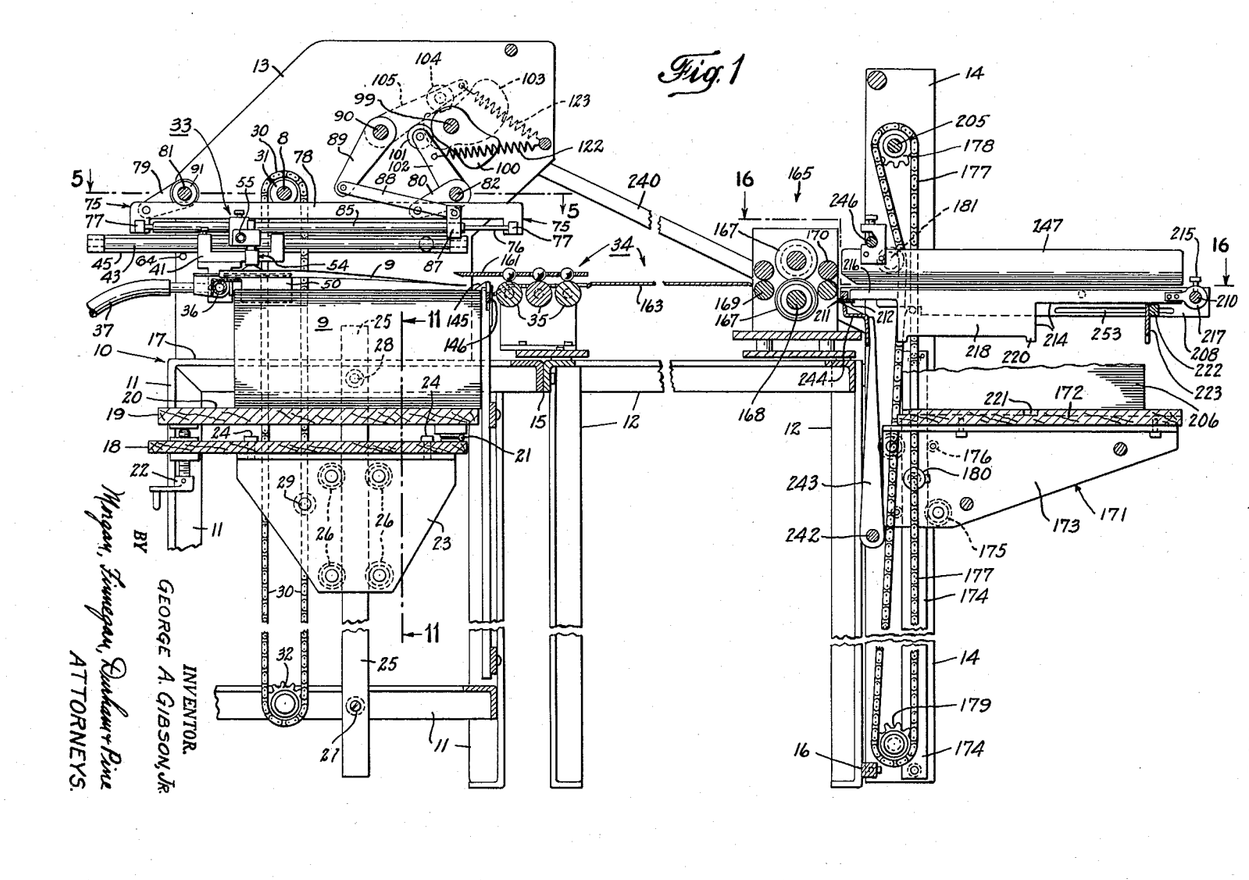
Fig. 1 is a longitudinal section taken near the center line of the apparatus showing the feeding, conveying and stacking mechanisms.
Figure 2:
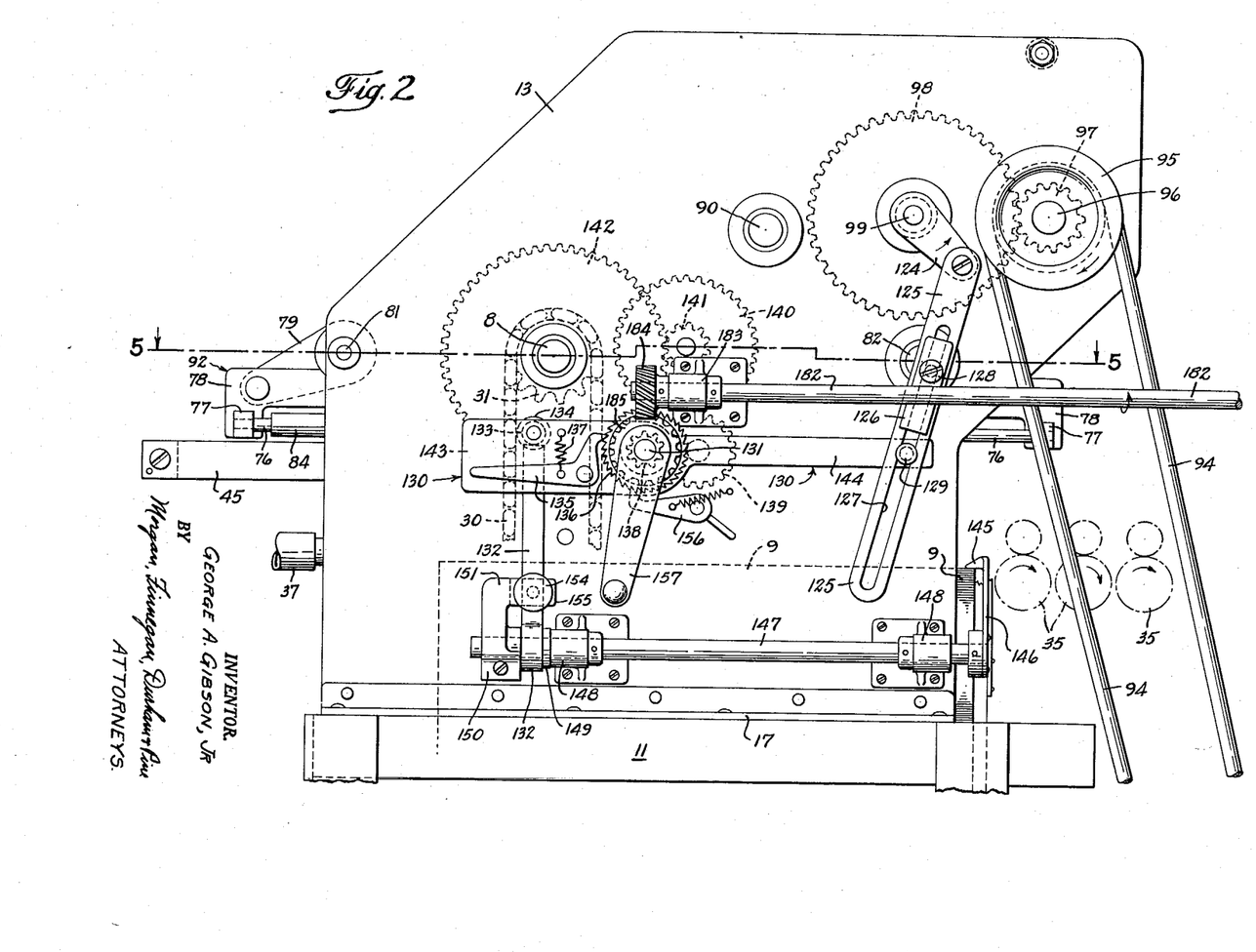
Fig. 2 is a side elevation of the upper right hand forward portion of the frame of the apparatus showing the means for raising and lowering the supporting platform for the feeding mechanism and the means by which the travel of the platform toward the transfer mechanism is regulated.

Referring now to the drawings and at first to Fig. 1 there is shown an illustrative embodiment of the invention. The numeral 10 denominates the frame of the apparatus which is generally formed of two main sections, 11, 12 and front and rear side members 13 and 14, respectively, bolted together as at 15, 16 and 17 (Fig. 2). The left hand portion of Fig. 1 generally constitutes the front section of the apparatus and comprises the feeding mechanism of the apparatus which inserts the flat sheets of the pile 9 into the conveying mechanism, generally situated in the central portion of the figure and indicated by the numeral 34. Supporting means for the sheets of flat articles are provided and preferably comprise a pair of platforms 18 and 19 mounted one above the other, in a substantially parallel relation, the upper platform 19 being provided with a surface 20 upon which the flat sheets 9 are piled. The platform 19 is joined to the platform 18 at its rearward edge by means of hinges 21 which permit the platform 19 to be tiltable with respect to the platform 18, such tiltable movement being effected by means of a manually adjustable screw jack 22 mounted on the front end of the platform 18 and abutting the underside of the platform 19. The purpose of tilting the platform 19 is to compensate for different heights between the front and rear edges of the pile 9 resulting from embossments or other raised sections on the flat articles.

The platform 18 is secured by bolts 24, to a pair of brackets 23 which are movably mounted by means of rollers 26 on vertical tracks or rails 25 secured to the frame 11 by machine screws as at 27 and 28. Vertical movement of the brackets 23 and the platforms 18 and 19 is effected by means of studs 29 provided on the brackets and fixedly secured to links in the endless chains 30 mounted for rotation on the sprockets 31 and 32. Sprockets 31 are secured on a transverse shaft 8 which is journaled in the side frames 13, and sprockets 32 are rotatably mounted on stub shafts carried by frame 11. Upward travel of the platforms 18 and 19 serves to carry the flat sheets piled on the platform 19 to the transfer mechanism generally designated by the numeral 33 which inserts them, one by one, into the conveying mechanism 34.

The transfer mechanism 33 comprises means for separating, gripping and carrying each sheet to the roller elements 35. To this end, the machine is preferably provided with a transverse tube 36 to which a supply of compressed air is delivered from a suitable source (not shown) by a flexible tube 37. Tube 36 is positioned adjacent the outermost top edge of pile 9 and is provided with spaced vertical slots 38 (Figs. 7 and 8) through which vertical columns of air are directed against the edge of the pile. The air so directed against the pile of flat sheets 9 raises several of the sheets adjacent the top of the pile and separates them whereby the compressed air is permitted to enter between the sheets and to maintain them in a separated condition. In order to accommodate various sized sheets the tube 36 is mounted so as to be longitudinally adjustable with respect to the side frames 13.

Figures 6, 7:
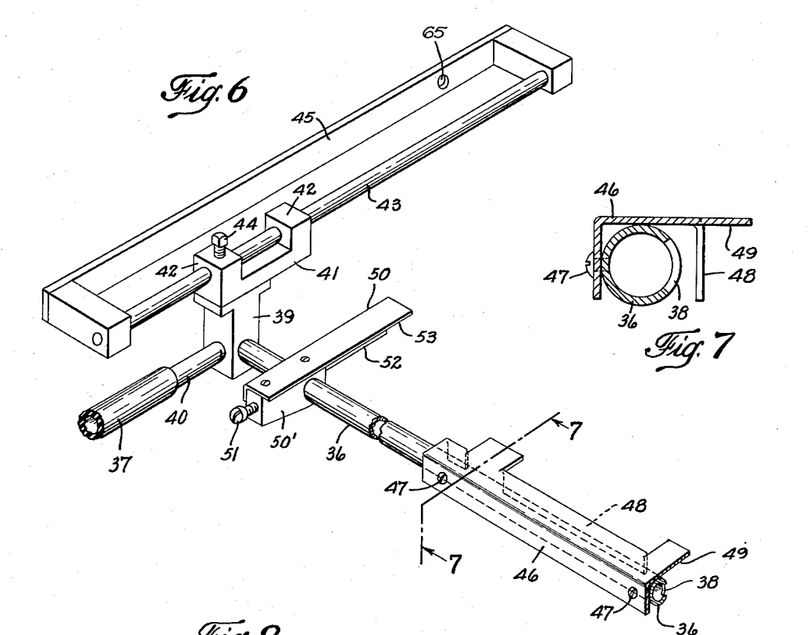
Fig. 6 is a perspective view of the sheet separating means.
Fig. 7 is a transverse sectional view taken along the line 7—7 in Fig. 6 in the direction of the arrows.

Referring now to Figure 6 wherein the adjusting structure is shown, the left hand end of rod 36, as featured in the drawing, is secured in block 39, as is the end of the flexible tube 37 by means of pipe 40. The block 39 is provided with an inner passage (not shown) by which the tube 36 communicates with the inner portion of the tube 37. A bracket 41, to which the block 39 is secured, is provided with lugs 42, having bores to receive the rod 43 upon which the bracket 41 may slide. A set screw 44 is provided to fixedly position the bracket on the rod 43 wherever desired and rod 43 is secured to the side frame 13 by means of the supporting member 45 which is pivotally secured to the frame at 65. Pivotal mounting of the member 45 on the frame 13 avoids damage to the separating or gripping means by the upward travel of the platform 19 as the pile 9 becomes exhausted. A pin 64 holds the member 45 against downward movement. Similar adjusting means are provided at the opposite, or right hand end, of tube 36 with the exception that no other flexible tube is provided. A front guide plate 46 is secured to rod 36 by screws 47 and is provided with surfaces 48 and 49 adapted to guide the front and top edges of the pile 9 respectively. A pair of similar side guide plates 50, provided with surfaces 52 and 53, are also secured to tube 36 by means of blocks 50' and set screws 51.

Figure 5:
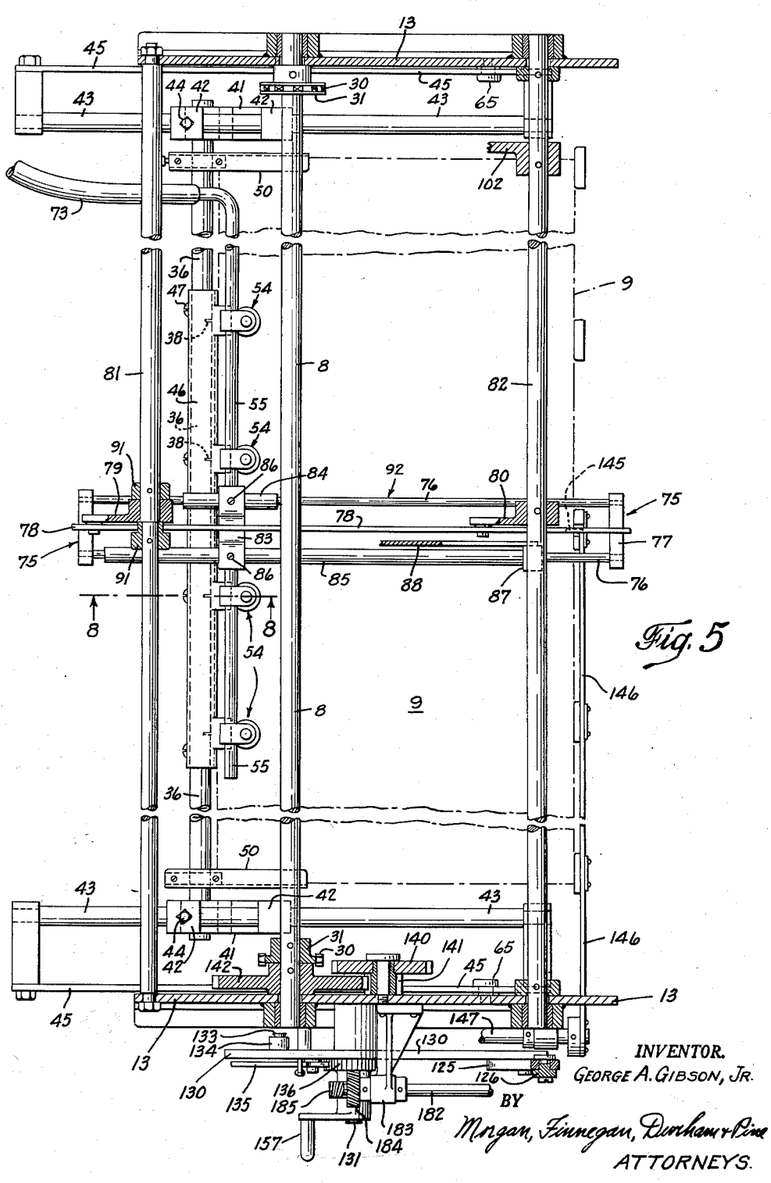
Fig. 5 is a plan view, partly in section, taken along the line 5—5 in Fig. 1 looking in the direction of the arrows, showing the separating, gripping and carrying means of the sheet transfer apparatus.

The gripping means for picking up the top sheet preferably comprises suction apparatus and in the preferred form of the invention shown in the drawings, a series of adjustably positionable suction devices 54 are transversely spaced across the top sheet of the pile 9 (Fig. 5). The suction devices 54 are mounted on a tube 55 by means of brackets 56 and are formed by a hollow cylindrical pin 57 (see Fig. 8) secured in a bore 58 in the bracket 56 by a set screw 59 and having its lowermost end formed with an enlarged head 60. Barrel 61, carrying rubber suction cup 62, is slidably mounted on the exterior of pin 57 and is prevented from dropping off the pin 57 by a shoulder 63 which would strike the enlarged head 60 on the pin. A passage 67 in barrel 61 exhausts air trapped between the head 60 and the shoulder 63 whenever relative movement occurs between the barrel 61 and the pin 57. By providing for relative movement between the pin 57 and the barrel 61 good suction is assured regardless of any irregularities or deformities occurring in the sheets between different suction cups.

Suction pressure is applied to the tube 55 through flexible tube 73 connecting the tube with control valve 74 and a source of suction pressure (not shown). Suction pressure is applied to the uppermost sheet of the pile 9 from an opening 68 in rubber suction cup 62, passageway 69 and orifice 70 in the pin 57, passageway 71 in bracket 56 and the orifice 72 in the tube 55.

The tube 55 is mounted on a carrying mechanism generally designated by the numeral 75 and preferably comprising a pair of parallel rod members 76 joined at their ends by brackets 77 to form a frame 92 (see Fig. 5). The frame 92 is mounted for arcuate parallel movement toward and away from the flat sheets 9 by means of a longitudinal bar 78 secured to the brackets 77 and also, at each end, pivoted to crank levers 79 and 80 mounted on the transverse shafts 81 and 82. Crank 79 is freely rotatable on the stationary shaft 81 and is positioned thereon by the collars 91, and crank 80 is fixedly secured to oscillatory shaft 82. Oscillation of shaft 82 (to be described hereinafter) effects the raising and lowering of the frame 92 toward and away from the pile 9 of flat sheets through the cranks 79 and 80. Tube 55 is carried by a block 83 fixedly secured to sleeve members 84 and 85 by the set screws 86. The sleeves 84 and 85 are slidably mounted on the rod members 76 by means of bushings 93 (Fig. 8) so that tube 55, block 83 and sleeves 84 and 85 form a sliding assembly on the frame 92. Secured to one end of the sleeve 85 is a lug 87 (Fig. 5) to which a link 88 is pivotally secured, said link also being pivoted, at its opposite end, to a crank lever 89 (Fig. 1), fixedly mounted on shaft 90 so that oscillation of the shaft 90 (to be described hereinafter) rocks the lever 89 and link 88 so as to cause the sleeves 84, 85 and hence the suction devices 54, to slide along the rods 76 of frame 92.

Oscillation of the shafts 82 and 90 is effected through the rotation of the cams 100 and 103. The cam 100 acts through the cam follower 101 carried on the end of lever 102 which is fixedly secured to the shaft 82 adjacent the inside face of the left hand frame member 13. Cam 103 acts through the cam follower 104 carried on the end of lever 105 which is fixedly secured to shaft 90 adjacent the outside face of the left hand frame member 13. Tension springs 122, 123 associated with cam levers 102, 105 serve to maintain the cam followers 101, 104 in operative contact with their respective cams.

The cams 100, 103 are mounted for rotation on a common drive shaft 99 journaled in each of the side frames 13 said shaft being rotated through the gear 98, fixed on the shaft 90 adjacent the inside face of the right hand frame 13, and gear 97 fixed on a stub shaft 96 journaled in the frame and having pulley 95 secured on the outer end thereof. Pulley 95 is driven in a clockwise direction through the belt 94 by a suitable source of power (not shown) which may preferably be an electric motor secured to the frame of the apparatus.

Figure 8:
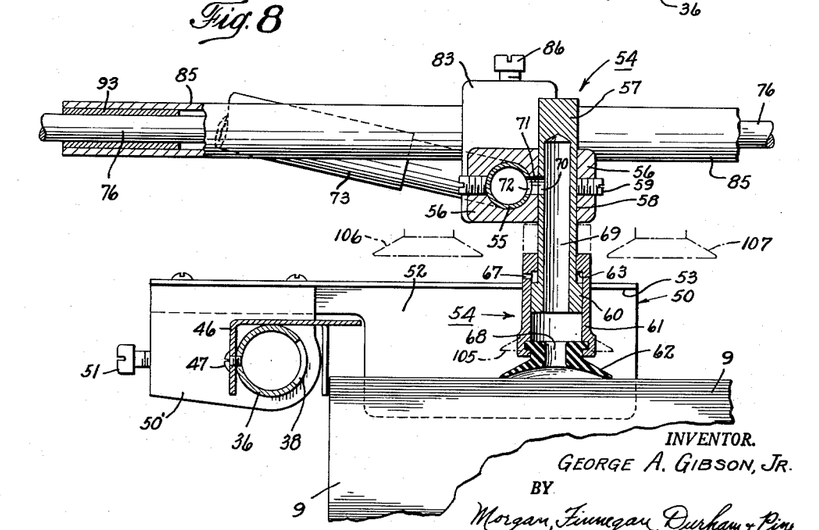
Fig. 8 is an enlarged sectional view of a portion of the transfer means, showing details of the separating and gripping means with successive positions of the gripping means indicated by dot and dash lines.

Cams 100 and 103 are shaped and mounted on shaft 99 so as to provide the proper sequence of operation of frame 92 and the sliding assembly for the suction devices and serve to impart combined vertical and longitudinal motion to the suction devices 54 to cause them to move successively to and through the positions indicated by the dot-dash lines 105, 106 and 107 in Fig. 8.

Figures 3, 4:
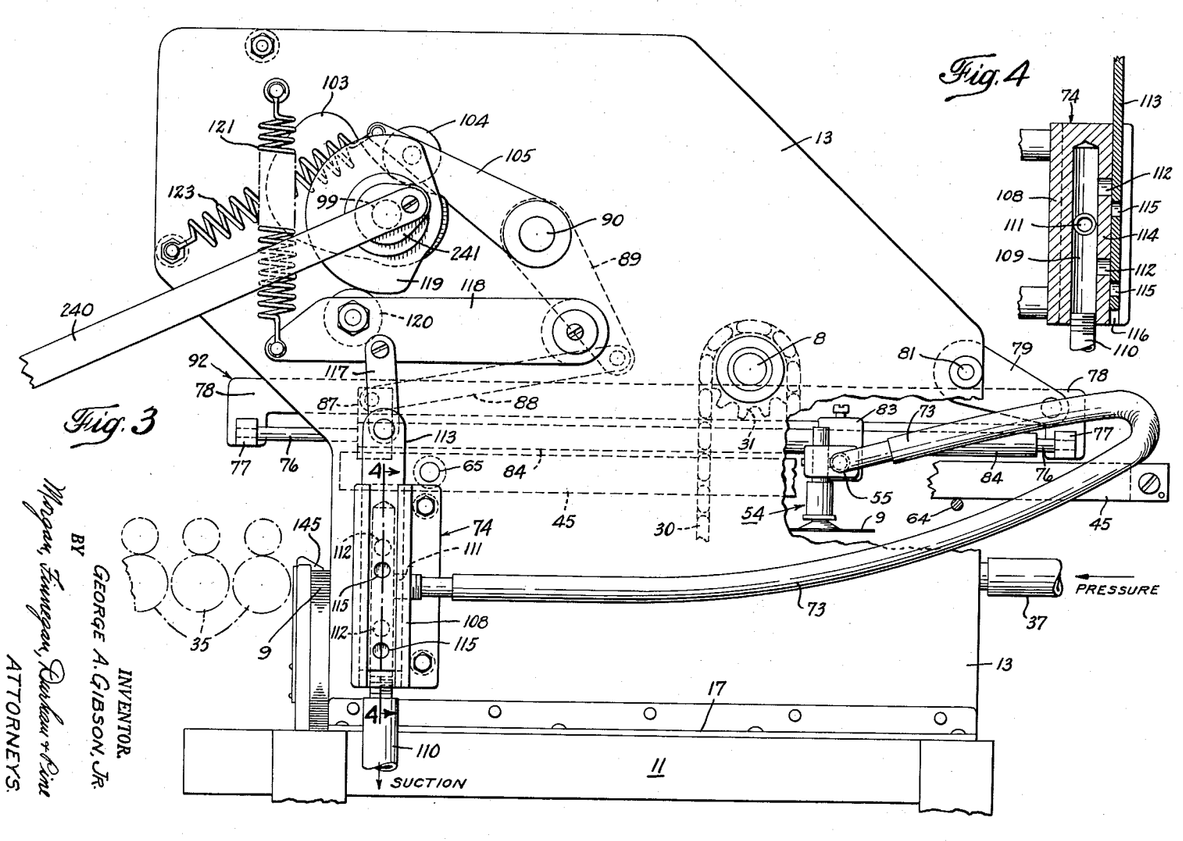
Fig. 3 is a side elevation of the upper left hand forward portion of the frame of the apparatus, partly broken away, showing the actuating and control mechanisms for the sheet gripping means.
Fig. 4 is a sectional view of a detail of Fig. 3 taken along the line 4—4 in Fig. 3 looking in the direction of the arrows, and showing the control valve for the sheet gripping apparatus.

Control means are provided whereby the suction on the sheet is released when the suction devices 54 are in their rearward position as shown by the dot-dash lines 107. As embodied, the control means comprises a valve 74 (Figs. 3 and 4) which communicates the flexible tube 73 with the atmosphere at the proper time thereby destroying the suction in the cups 62 and releasing the sheet. The body 108 of the valve is mounted on the outer face of the left hand side frame 13 and has a chamber 109 connected by a conduit 110 to a source of suction pressure (not shown), and communicating with flexible tube 73 through the orifice 111. The chamber 109 has apertures 112 formed in the outer wall 114, said apertures being normally closed by a slidable plate 113 provided with similarly spaced apertures 115 so positioned as to be out of register with the apertures 112 during the greater portion of the stroke of the carrying mechanism. The plate 113 slides in groove 116 in the valve body 108 and is connected by a link 117, to a cam lever 118 pivotally mounted on the frame 13 adjacent the shaft 90. Cam lever 118 and its follower 120 are actuated by a cam 119 provided on the shaft 99. A spring 121 constantly urges the follower 120 against the cam 119. Upon rotation of the shaft 99 the proper cam surfaces on the cam 119 causes the lever 118 to raise slidable plate 113 to bring the apertures 112 and 115 into register whereby the suction line is exhausted to the atmosphere.

Control of the upward travel of the platforms 18 and 19 toward the transfer mechanism 33 is achieved in a unique and novel manner. (See Figs. 2 and 9.) Shaft 99 carries a crank arm 124 on the outer face of the right hand side frame 13. Pivotally joined to the end of arm 124 is a slotted link 125 having a block 126 adjustably secured in the slot 127 by the screw 128. A pin 129 is provided on a lever 130 and resides within slot 127 in slidable relation thereto. As the shaft 99 and arm 124 rotate, the slotted link 125 rides up and down, sliding and pivoting about the pin 129 on lever 130. The lever 130 is pivoted on a shaft 131 (Fig. 9) and is maintained in substantially horizontal position by a stop lever 132, abutting the underside of a peg 133 on spacer 134 secured to the heavier end 143 of lever 130. A pawl 135 (Fig. 2) is pivoted on the heavy end of lever 130 and engages ratchet 136 fixed on shaft 131 under the constant urging of a spring 137. On the inner face of right hand side frame 13 shaft 131 is provided with gear 138 which drives the endless chains 30 through a train of gears 139, 140, 141, 142 and sprockets 31 secured on the transverse shaft 8. While the lever 130 is in the horizontal position no motion of the slotted link 125 is transmitted to the chain through the pawl 135 and ratchet 136, but when the stop lever 132 is withdrawn from underneath the peg 133 on the lever 130 the heavy end 143 thereof pivots downwardly on shaft 131 thereby moving the pawl to the next ratchet tooth. When the upraised end 144 of the lever 130 is engaged by the descending block 126 and pushed downwardly the pawl 135 turns the ratchet wheel 136 on the shaft 131 and advances the chains 30 through the gears 138, 139, 140, 141, 142, and sprockets 31 on shaft 8.

Figures 9, 10, 11:
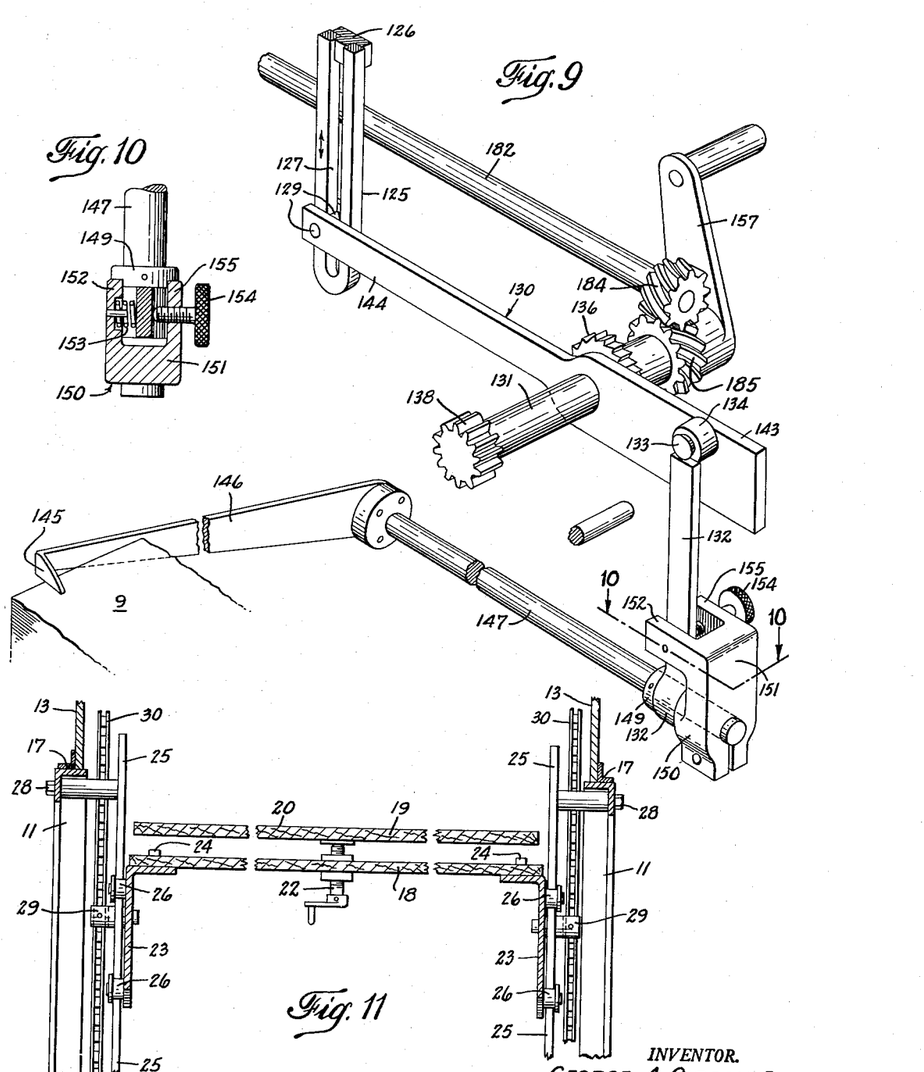
Fig. 9 is a perspective view, with all interfering frame and supporting portions of the apparatus eliminated, of the control apparatus which regulates the travel of the sheet elevating means toward the transfer means.
Fig. 10 is a sectional view of a detail of Fig. 9 taken along the line 10—10 looking in the direction of the arrows.
Fig. 11 is a transverse sectional view taken along the line 11—11 in Fig. 1 looking in the direction of the arrows, showing details of the sheet supporting means.

Suitable control means are provided whereby the stop lever 132 is periodically removed from underneath the peg 133 in accordance with the rate at which the height of the pile 9 decreases. To this end the catch 145 at the back of the pile 9 is provided with an arm 146 mounted on shaft 147. The shaft 147 is mounted upon bearings 148 secured to the outer face of right hand side frame 13 and at the front end thereof carries stop lever 132. The lever 132 is positioned on the shaft 147 by means of the collar 149 and the clamp 150. As shown in Figs. 9 and 10 clamp 150 is shaped at its upper end in the form of a yoke 151 through which the stop lever 132 projects. One arm 152 of the yoke carries spring 153 which urges lever 132 against the adjusting screw 154 carried by the opposite side 155 of the yoke by which the relative position of the lever 132 with respect to the yoke 151 may be selectively varied. Due to the strength of the spring 153 once this adjustment has been made the positions of the lever and the yoke are fixed and the rotation of the shaft 147 and yoke 151 results in a like rotation of the stop lever 132.

With the removal of each sheet of the pile 9 the catch 145 is lowered a distance equal to the thickness of the sheet and arm 146 tends to rotate a slight amount. The rotation of the arm 146 is restrained by the weight of the lever 130 resting on the stop lever 132 fixedly positioned in the yoke of clamp 150. However, the block 126 on the slotted link 125 is so positioned in the slot 127 so that it will slightly contact and move the lever 130 at the extreme downward position of the crank arm 124. Each revolution of the crank arm thereafter causes the block 126 to strike the lever 130 and momentarily release the stop lever 132. Each time the lever 130 releases the stop lever 132, clamp 150 and shaft 147 rotate very slightly so that the top of lever 132 moves axially along peg 133 and away from lever 130. After a certain number of sheets have been removed the stop lever 132 is entirely withdrawn from underneath peg 133 and the lever 130 will pivot counterclockwise about the shaft 131. Upon the pivoting of lever 130 the pawl 135 engages the next ratchet tooth on the wheel 136 and when the next revolution of crank arm 124 brings block 126 into contact with the pin 129 on the lever 130 and the lever 130 is rotated in a clockwise direction, as shown in the drawing, thereby advancing the chains 30 and raising the platform 19 a sufficient amount to compensate for the number of sheets which have been withdrawn since the last advancement of the chains. As the platform is raised the catch 145, arm 146, shaft 147 and stop lever 132 are rotated in the opposite direction and the stop lever 132 is restored to its position underneath peg 133 thereby halting the endless chains 30. A second pawl 156 holds the ratchet 136 against counter-rotation of the shaft 131 when the lever 130 is being pivoted counterclockwise. A handle 157 is also provided on the shaft 131 for manually operating the chains 30 and platform 19 whenever it is desired to do so.

Figure 16:
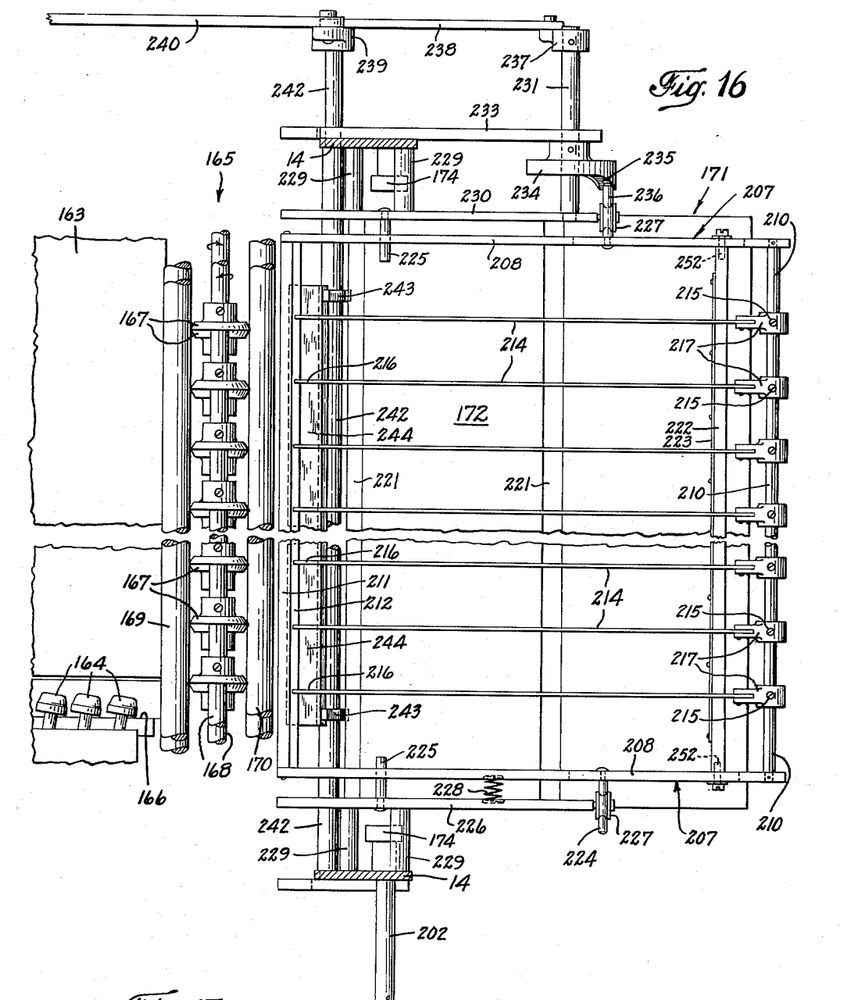
Fig. 16 is a plan view, partly in section, taken along the line 16—16 in Fig. 1 looking in the direction of the arrows, showing the separating means of the stacking mechanism and the cutting or slitting means and roller elements of the conveying mechanism.
Figure 17:
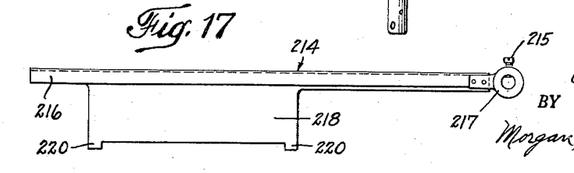
Fig. 17 is a side elevation showing a detail of the dividing means for the cut strips.
Figures 18, 19:
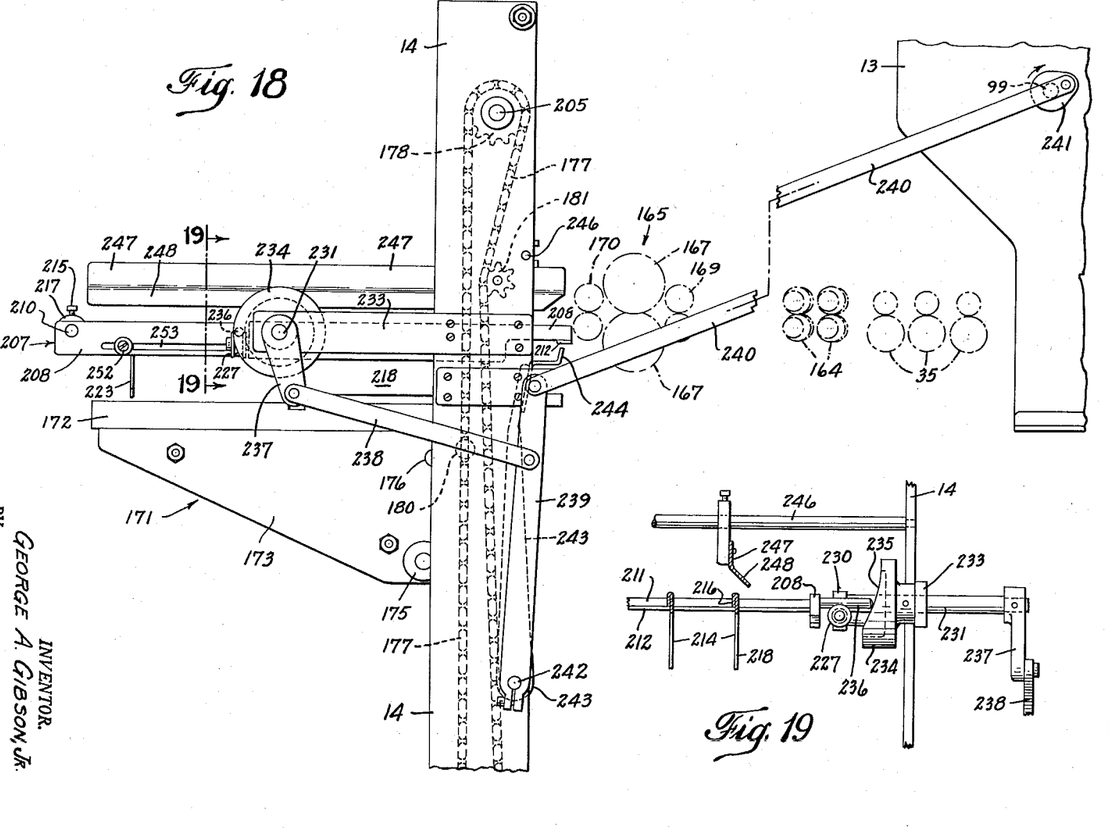
Fig. 18 is a side view of a portion of the left rear and left front portions of the apparatus showing construction and actuating details of the stacking mechanism.
Fig. 19 is a sectional view, taken along the line 19—19 in Fig. 18, looking in the direction of the arrows, showing details of the dividing means of the stacking mechanism.

The feeding mechanism feeds the flat sheets into a conveying mechanism 34 mounted on the frame 12 said mechanism comprising a series of transverse roller elements 35 which receive the sheets from the transfer mechanism. The rollers 35 are driven from a source of power (not shown) which may or may not be the same source of power for actuating cams 100, 103 and 119 and the platforms 18 and 19. Suitable guides 161 are provided adjacent the rollers 35 to insure that the sheets find their way into the roller elements. After the sheets pass through the roller elements 35 they are carried along plate 163 by a series of side roller elements 164 (Figs. 16 and 18) which forward the sheets from the transverse roller elements 35 to cutting or slitting means 165 positioned at the rear of plate 163 and frame 12. Proper register with the cutting means 165 is assured by the guide surfaces 166 against which the angularly disposed side roller elements 164 drive the sheets. The cutting means 165 comprise a plurality of individual rotary cutters 167 adjustably disposed along shafts 168. Rollers 169 and 170 are disposed on either side of the cutters 167 to feed the sheets into and out of the cutting means and to assure proper cutting.

The cut-sheet supporting means 171 of the stacking mechanism comprises a platform 172 secured at each side margin to a pair of brackets 173 movably mounted on a pair of tracks or rails 174 secured to each frame member 14. The brackets 173 are provided with rollers 175 and pins 176 so mounted as to engage opposite sides of tracks 174. Adjacent each side frame 14 is an endless chain 177 which is mounted on sprockets 178, 179 and idler sprocket 181, and each chain is anchored to one of the platform brackets 173 by studs 180 fixedly secured to the brackets. The drive sprockets 178 are each keyed to a shaft 205 so that rotation of the shaft serves to drive both chains 177 at a uniform rate. Chains 177 are moved at the same rate as the front chains 30 but in the opposite direction so that the platform 172 lowers at the same rate the front platform 19 raises. This construction assures a substantially constant level for the top of the piles of cut segments deposited on the platform 172 after passing through the cutting means 165. Movement of the endless chains 177 is accomplished by the provision of a drive shaft 182 mounted in suitable bearings 183 on the right hand frame members 13 and 14. At its front end, shaft 182 is provided with a helical gear 184 which meshes with a similar gear 185 keyed on shaft 131 (Figs. 2 and 9). Movement of the shaft 131 in response to lever 130 and pawl 135 rotates gears 185 and 184 and shaft 182 in the directions indicated by the arrows.

Figures 13, 14, 15:
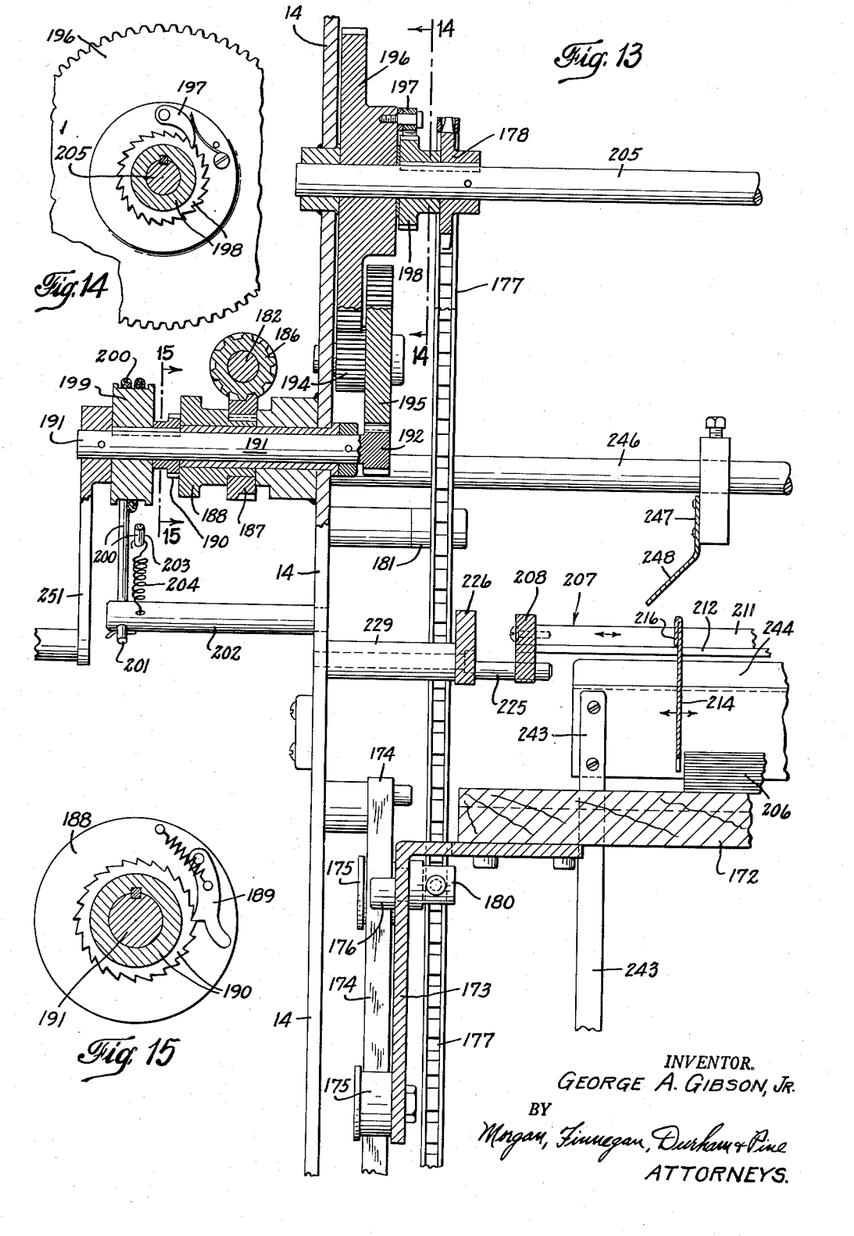
Fig. 13 is a sectional view taken along the line 13—13 in Fig. 12 looking in the direction of the arrows, showing details of the lowering and raising mechanism for the supporting means for the cut segments.
Fig. 14 is a view, partly in section, taken along the line 14—14 in Fig. 13 looking in the direction of the arrows, showing a detail of the lowering mechanism for the supporting platform for the cut segments.
Fig. 15 is a view, partly in section, taken along the line 15—15 in Fig. 13 looking in the direction of the arrows, showing a detail of the means for lowering the supporting platform for the cut segments.

At the opposite, or rearward end, shaft 182 is provided with another helical gear 186 meshing with gear 187 (Fig. 13). Gear 187 is keyed to collar 188 (Fig. 15) which carries a pawl 189 for engaging teeth on a ratchet wheel 190 keyed to the shaft 191. Shaft 191 is provided with a spur gear 192 at the inner side of frame 14. Gear 192 drives the gear 196 through the intermediate gears 194 and 195. Gear 196 is mounted on shaft 205 but not keyed thereto. A pawl 197 is provided on the gear 196 so as to cooperate with the ratchet wheel 198 which is keyed to the shaft 205. Rotation of the shaft 182 in the direction indicated by the arrows rotates gear 186 counter-clockwise as shown in Fig. 13 when viewed from the left, thereby rotating the shaft 191 and gear 192, through the pawl 189 and ratchet wheel 190 in the direction indicated by the arrows. Rotation of gear 192 in this direction rotates gear 196 in a counter-clockwise direction as shown in Fig. 14. As the gear 196 rotates in the counter-clockwise direction the weight of the platform 172, transmitted through the brackets 173 and endless chains 177, rotates the sprockets 178 and ratchet wheel 198 in the same direction.

Figure 12:
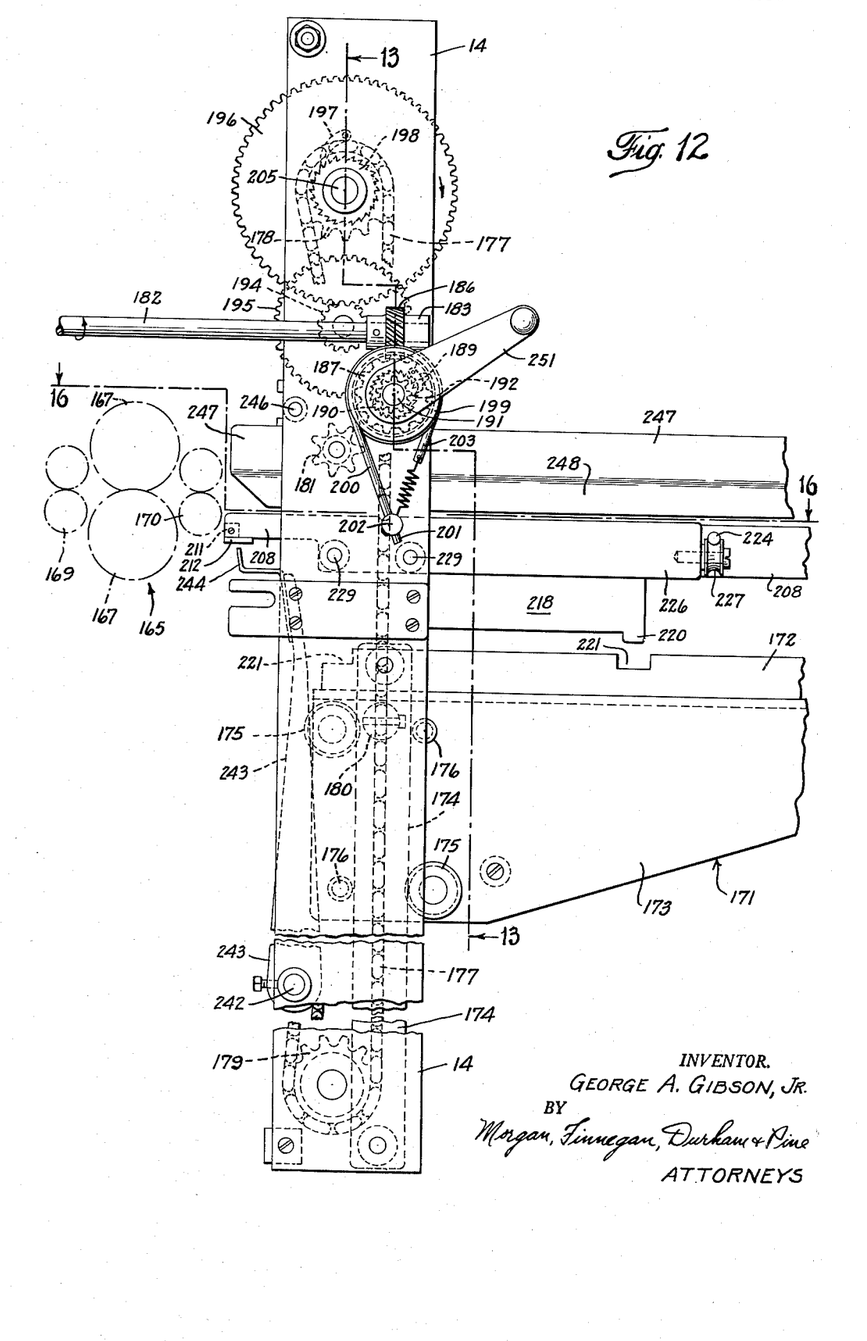
Fig. 12 is a side elevation of the rear portion of the apparatus showing the stacking mechanism.

Since the platform 172 is lowered through the gravitational action of its own weight whenever the gear 196, and pawl 197 are rotated by the action of the front platform 19, no damage can result, should the platform 172 be lowered so far as to touch the floor. The pawl 197 and ratchet wheel 198 will slip relatively when the platform 172 and chains 177 are blocked from movement but the gear 196 will continue to move. Means must be provided, however, to hold the weight of the platform 172 so that it will only be permitted to drop when the pawl collar 188 is rotated by movement of the front platform raising mechanism. If this were not provided for the weight of platform 172 would drive ratchet 190 clockwise (Fig. 15) uncontrolled by pawl 189. To this end the applicant prefers to mount and key a brake pulley 199 to shaft 191. A flexible strap 200 is wound around the pulley 199 and has one end 201 fixedly secured to a post 202 mounted on frame 14 while the opposite end 203 is secured to a spring 204 also secured to post 202. The strength of spring 204 is selected so as to prevent rotation of brake pulley 199 by the loaded or unloaded weight of platform 172 unless the pulley 199 is forced to rotate by the pawl 189 as it acts through ratchet 190 by reason of front platform movement. Rotation of shaft 191 and pulley 199 in a clockwise direction as shown in Fig. 12 maintains the tightness of the brake strap 200 on the pulley while the counter-clockwise rotation tends to loosen the brake due to the "give" of spring 204. A crank handle 251 is secured to shaft 191 and when manually rotated in the proper direction will raise the platform 172 without much interference from the brake strap 200.

The stacking mechanism is also provided with means for guiding and maintaining cut segments emerging from the cutting or slitting means 165 into neatly stacked piles 206 on the platform 172. As preferably embodied these guiding means comprise an oscillatable frame 207 formed by parallel side members 208 joined at the rear end by the rod 210 and at the other end by a square rod 211 having strap 212 joined thereto to form a ledge. A series of dividers 214 are adjustably mounted on rod 210 by lugs 217 and set screws 215 and at their opposite ends are provided with extensions 216 adapted to rest on the strap 212. The main portion of the dividers 214 consists of plates 218; the purpose of said plates being to abut the side of the piles 206 of the segments to keep them in neat order. The bottom edges of the plates 218 are provided with lugs 220 which may be accommodated in recesses 221 on the platform 172 whereby the plates 218 may stack evenly the first few sheets in each pile of segments. Side members 208 are also provided with slots 253 to adjustably carry a rod 222 which has a front stop plate 223 secured to it to deflect the cut segments downwardly into the piles. Longitudinal adjustment of the stop plate 223 is effected by loosening the screws 252 mounted in slots 253 holding the rod 222 to the side members 208.

In order to permit oscillation of the frame 207 the side members 208 are supported by pins 224, 236 and 225. The pins 225 are fixed in the side braces 226, 230, which support the side members 208, said pins being of sufficient length to allow the frame 207 to oscillate sidewise to a considerable extent. Frame 207 is also supported by the pins 224, 236 mounted in the members 208 and adapted to rest in grooved rollers 227 rotatably mounted in the ends of the side braces 226 and 230. A spring 228 is inserted at one side between the brace 226 and and the side member 208. Cylindrical supports 229 secure the braces 226 and 230 to the adjacent frame 14. In addition to the supports 229, the brace 230 is provided with a shaft 231 having one end journaled in the brace and its central section journaled in a side plate 233 mounted on frame 14. A cam 234, secured to shaft 231 immediately adjacent the inner side of the plate 233 has a cam face 235 formed as an inclined plane. Due to the force of the spring 228, the pin 236 constantly abuts the cam face 235 on the cam 234.

The end of shaft 231 is provided with crank lever 237 secured to link 238. The opposite end of link 238 is pivoted to a rocker arm 239 mounted on the transverse shaft 242 journaled in the two frames 14. The free end of rocker arm 239 has a link 240 pivoted thereto which extends from the rear frame 14 to the front frame 13 where it is pivoted to the crank collar 241 secured on shaft 99. As shaft 99 rotates, crank 241 oscillates levers 239 and 237 and shaft 231 and cam 234. Oscillation of the cam 234 causes the cam face 235 to move the pin 236 and frame 207 back and forth in a sidewise direction.

On the inner side of the frame 14 shaft 242 carries a pair of arms 243 having a pusher plate 244 mounted therebetween at the outer ends thereof. Plate 244, upon oscillation of shaft 242, strikes the trailing edge of the cut segments and pushes them backwardly against plate 223 into neat piles. A rod 246 is provided between frames 14 and on this rod are mounted adjustable deflector plates 247 designed to guide the excess trim away from the dividers 214; deflection of the trim being accomplished by the bent portion 248.

The invention in its broader aspects is not limited to the specific mechanisms shown and described but departures may be made therefrom within the scope of the accompanying claims without departing from the principles of the invention and without scarificing its chief advantages.

I claim:

1. Apparatus for feeding and processing flat stock such as sheets and the like comprising in combination input means adapated to receive said stock, processing means adapted to receive said stock from said input means and to process the same, output means adapted to be displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

2. Apparatus in accordance with claim 1, in which said control means includes means for periodically causing the movement of said input means and output means to maintain said stock in a substantially constant relationship with respect to said delivery means and said processing means.

3. Apparatus for feeding and processing flat stock such as sheets and the like comprising in combination a movable input load carrier adapted to carry said stock, processing means, selecting means and mechanical actuating means to which said selecting means are coupled, said selecting means being operable to select components of said stock and being operated in turn by said actuating means to move said selecting means from engagement with said stock to a position operably associated with said processing means, motive means, a gravity-displaced output load receiver adapted to receive processed stock from said processing means, and control means including sensing means for measuring the position of said stock on said input carrier relative to a reference, means for periodically sampling said sensing means and carrier control means responsive to said sampling means when said sensing means achieves a position corresponding to a predetermined change in said stock position, said control means being adapted to couple said motive means to said input load carrier and to subject said output receiver independently of the weight of said stock carried by said input load carrier, to the effects of gravity whereby said input carrier and said output receiver are moved to compensate for the decrease in input stock and the increase in processed stock.

4. Apparatus according to claim 3, in which said sensing means limits the motion of said carrier control means during the sampling period except when said sensing means has been displaced a predetermined angular amount at which time said carrier control means is no longer so limited and moves an additional amount which additional movement causes the coupling of said motive means to said input load carrier and the release of said output receiver to the effects of gravity.

5. In apparatus which includes means for processing sheets of paper and the like, means for controlling the delivery to an extraction of sheets from said processing means comprising a movable input carrier adapted to receive a pile of sheets and to render the same accessible to said processing means, a gravity driven movable output carrier adapted to receive the output of said processing means, a source of motive power, load sensing means responsive to the work load of said apparatus, periodically operable coupling means energized by said source of power, input/output control means adapted to control the relative positions of said input and output carriers, said control means being periodically coupled to said load sensing means by said periodically operable coupling means, said control means including means actuated upon predetermined movement of said sensing means for driving said input carrier from said periodically operable coupling means and for applying the effect of gravity to said output carrier whereby said carriers are each moved in accordance with the relationship of processed stock to unprocessed stock.

6. In apparatus which includes means for processing sheets of paper and the like, means for controlling the delivery to and extraction of sheets from said processing means comprising a movable input carrier adapted to receive a pile of sheets and to render the same accessible to said processing means, a gravity driven movable output carrier adapted to receive the output of said processing means, a source of motive power, load sensing means comprising lever means angularly responsive to the work load of said apparatus, periodically operable coupling means pulsatingly energized by said source of power, input/output control means adapted to control the relative positions of said input and output carriers, said control means being periodically coupled to said lever means by said periodically operable coupling means except when said lever has moved a predetermined angular amount, said control means including racthet means actuated when said lever means is so decoupled from said control means due to said angular movement, said ratchet means being coupled to means for driving said input carrier from said periodically operable coupling means and means for controlling the effect of gravity on said output carrier whereby said carriers are each moved to maintain a predetermined input-output relationship based on the magnitude of sheets on said input carrier.

7. In apparatus which includes means for processing sheets of paper and the like, means for controlling the delivery to and extraction of sheets from said processing means comprising a movable input carrier adapted to receive a pile of sheets and to render the same accessible to said processing means, a movable output carrier adapted to receive the output of said processing means, a source of motive power, load sensing means comprising angularly responsive lever means adapted to sense the work load of said apparatus, periodically operable eccentric coupling means energized by said source of power, a rocker periodically coupled at one end to said eccentric coupling means and at the other end being alternatively coupled to said lever means except when said lever means is angularly displaced a predetermined amount at which time said rocker is additionally displaced, ratchet means, pawl means carried by said rocker and adapted to displace said ratchet means when said additional displacement of said rocker occurs, transmission means between said ratchet means and said input carrier and output carrier for actuating the same in accordance with said load.

8. Apparatus for feeding, cutting, and stacking flat stock such as paper or the like, comprising, in combination, first movable supporting means upon which a plurality of flat articles may be piled, cutting means for cutting the articles into segments, apparatus for separating the articles adjacent the top of the pile, carrying means for individually removing the articles from the pile, conveying mechanism for receiving the articles from the carrying means and forwarding them to the cutting means, means for moving the first supporting means toward the carrying means, second movable supporting means for supporting the cut segments, control means interconnecting said means for moving said first supporting means and said second supporting means and adapted to move said second supporting means inversely with respect to said first supporting means, and apparatus comprising a laterally oscillatable member positioned transversely of the cut segments and longitudinally extending plates forming a series of open sections adapted to closely receive the respective cut segments.

9. Apparatus for feeding, cutting and stacking flat stock such as paper or the like comprising in combination a vertically movable input platform adapted to support a pile of sheets and including means for adjusting the inclination of such platform, pneumatically energized manually adjustable separator means located adjacent the top of said pile, said separator means being tiltably mounted and adapted to vertically separate sheets from the top of said pile, pneumatically energized pick-up means adjacent the top of said pile and including a suction member adapted to contact and grip the top sheet of said pile, pick-up pneumatic control means including cam means and a cut-off valve responsive to said cam means said cam means being coupled to primary synchronizing means including a shaft driven by a source of motive mechanical power, pick-up position control means controlled by said primary synchronizing means and coupled to said pick-up means and including carrier means adapted to carry said pick-up means said carrier means having a single degree of freedom confined to horizontal motion, conveyor means responsive to the output of said pick-up means, said conveyor means being located adjacent said pick-up means and adapted to receive sheets carried by said pick-up means, cutting means responsive to the output of said conveyor means and adapted to receive sheets from said conveyor means and to cut said sheets into segments, oscillatable stacking means responsive to the output of said cutting means and adapted to receive said segments from said cutting means and to align said segments in vertical piles, said stacking means including lateral segment positioning means and longitudinal segment positioning means, stacking control means including cam means coupled to and responsive to said synchronizing means and including connections to said lateral segment positioning means and to said longitudinal segment positioning means, a gravity driven movable output platform adapted to receive the segment piles formed by said stacking mechanism and means for controlling the relative position of said input and output platforms comprising pile-height sensing means located adjacent said sheet pile and including means responsive to the height of said pile on said input platform, input-output platform control means responsive to said sensing means and including means for periodically decoupling said platform control means from said sensing means, means synchronized with said decoupling means for coupling said source of power to said input platform upon predetermined displacement of said sensing means and means synchronized with said synchronized means for coordinately subjecting said output platform to the action of gravity.

10. Apparatus for feeding and processing flat stock such as sheets and the like comprising in combination input platform means adapted to receive and carry said stock, processing means adapted to receive said stock from said input platform means and to process the same, output platform means adapted to be displaced by gravity and arranged to receive and carry the processed stock, and control means, said control means being responsive to the magnitude of said stock and including means for controlling said input platform means and for controlling independently of the weight of said stock received by said input means, the displacement by gravity of said output platform means whereby said input and output platform means are coordinately adjusted in relation to the magnitude of said stock.

11. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, motive means and control means, said control means being responsive to the magnitude of said stock and including means for controlling the application of power from said motive means to said input means and for controlling, independently of the weight of said stock received by said input means, the displacement by gravity of said output means whereby said input means and output means are coordinately adjusted in relation to the magnitude of said stock.

12. Apparatus for feeding and processing flat stock such as sheets and the like comprising in combination input means adapted to receive said stock, processing means adapted to receive said stock from said input means and to process the same, said processing means including cutting means adapted to cut the pieces of said stock, output means adapted to be displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

13. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, and control means, said control means including means responsive to the height of the pile of stock on said input means and also including means responsive to said height responsive means for controlling said input means and for controlling, independently of the weight of said stock received by said input means, the displacement by gravity of said output means whereby said input means and output means are coordinately adjusted in relation to the height of said stock.

14. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, and control means, said control means being responsive to the magnitude of said stock for adjusting the position of said input means relative to said processing means and for controlling, independently of the weight of said stock received by said input means, the displacement by gravity of said output means whereby said input means and output means are coordinately adjusted in relation to the magnitude of said stock.

15. Apparatus for feeding and processing flat stock such as sheets and the like comprising in combination input means adapted to receive said stock, processing means, delivery means including separating means adapted to select work pieces from said stock of said input means and to transport said selected pieces to said processing means, said processing means being adapted to receive said stock from said input means and to process the same, output means adapted to be displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

16. Apparatus for feeding and processing flat stock such as sheets and the like comprising in combination input means adapted to receive said stock, output means, processing means adapted to receive said stock from said input means and to process the same, said processing means including stacking means adapted to stack and align said processed stock on said output means, said output means being adapted to be displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

17. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, and control means, said control means being responsive to the magnitude of said stock and including means for controlling said input means in accordance with said stock magnitude and for controllably releasing said output means in accordance with stock magnitude but independently of the weight of said stock received by said input means to thereby render said output means responsive to gravity whereby said input means and output means are coordinately adjusted in relation to the magnitude of said stock.

18. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, and control means, said control means being responsive to the magnitude of said stock and including means for raising said input means as said stock magnitude diminishes and means for coordinately releasing said output means independently of the weight of said stock received by said input means, to be thereby lowered under the influence of gravity whereby said input means and output means are coordinately adjusted in relation to the magnitude of said stock.

19. Apparatus for feeding and processing flat stock such as sheets and the like comprising in combination input means adapted to receive said stock, output means, processing means adapted to receive said stock from said input means and to process the same, said processing means including delivery means and stacking means arranged to stack and align said processed stock on said output means, said stocking means including oscillator means and means for synchronizing said oscillator means with said delivery means, said output means being displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

20. Apparatus for feeding and processing flat stock such as sheets and the like comprising in combination input means adapted to receive said stock, delivery means including separating means adapted to select work pieces from said stock on said input means, said separating means including stock pick-up means and actuating means therefor, said actuating means including longitudinal drive means and vertical drive means, said longitudinal drive means being movably carried on said vertical drive means, processing means adapted to receive said stock from said delivery means and to process the same, output means adapted to be displaced by gravity and arranged to receive the processed stock, and control means, said control means being responsive to the magnitude of said stock and including means for controlling said input means and for controlling, independently of the weight of said stock received by said input means, the displacement by gravity of said output means whereby said input means and output means are coordinately adjusted in relation to the magnitude of said stock.

21. Apparatus for feeding and processing flat stock such as sheets and the like comprising in combination input means adapted to receive said stock, processing means adapted to receive said stock from said input means and to process the same, output means adapted to be displaced by gravity and arranged to receive the processed stock, and control means, said control means including means for sensing the magnitude of said stock, means for periodically sampling the output of said sensing means and also including means actuated when said output reaches a predetermined condition for applying control signals to said input means and said output means for causing movement of said input means and movement of said output means independent of the weight of said stock received by said input means, whereby said input and output means are coordinately adjusted in relation to the magnitude of said stock.

22. Apparatus for feeding and processing flat stock such as sheets and the like comprising in combination motive means, a movable input load carrier adapted to carry said stock, processing means, mechanical actuating means comprising a frame and cam means energized by said motive means and coupled to said frame for reciprocating the same, selecting means slidably disposed on said frame and reciprocated thereon by second cam means also energized from said motive means, said selecting means being thus operable to select components of said stock and to move from engagement with said stock to a position operably associated with said processing means, a gravity displaced output load receiver adapted to receive processed stock from said processing means, and control means including sensing means for measuring the position of said stock on said input carrier relative to a reference, means for periodically sampling said sensing means and carrier control means responsive to said sampling means when said sensing means achieves a position corresponding to a predetermined change in said stock position, said carrier control means being adapted to couple said motive means to said input load carrier and to subject said output receiver, independently of the weight of said stock carried by said input load carrier, to the effects of gravity whereby said input carrier and said output receiver are moved to compensate for the decrease in input stock and the increase in processed stock.

23. Apparatus for feeding and processing flat stock such as sheets and the like comprising in combination a movable input load carrier adapted to carry said stock, processing means, selecting means and mechanical actuating means to which said selecting means are coupled, said selecting means being operable to select components of said stock and being operated in turn by said actuating means to move said selecting means from engagement with said stock to a position operably associated with said processing means, motive means, a gravity displaced output load receiver adapted to receive processed stock from said processing means, control means including sensing means for measuring the position of said stock on said input carrier relative to a reference, means for periodically sampling said sensing means and carrier control means responsive to said sampling means when said sensing means achieves a position corresponding to a predetermined change in said stock position, said carrier control means being adapted to couple said motive means to said input load carrier and to subject said output receiver, independently of the weight of said stock carried by said input load carrier, to the effects of gravity whereby said input carrier and said output receiver are moved to compensate for the decrease in input stock and the increase in processed stock and a stacking mechanism disposed adjacent said output receiver and adapted to align said processed stock as it is received by said output receiver, said stacking mechanism including lateral moving and longitudinally moving oscillators energized by mechanical coupling means from said motive means.

24. In apparatus which includes means for processing sheets of paper and the like, means for controlling the delivery to and extraction of sheets from said processing means comprising a movable input carrier adapted to receive a pile of sheets and to render the same accessible to said processing means, a gravity driven movable output carrier adapted to receive the output of said processing means, a source of motive power, load sensing means comprising lever means angularly responsive to the work load of said apparatus, periodically operable coupling means pulsatingly energized by said source of power, input/output control means adapted to control the relative positions of said input and output carriers, said control means being periodically coupled to said lever means by said periodically operable coupling means except when said lever has moved a predetermined angular amount, said control means including ratchet means actuated when said lever means is so decoupled from said control means due to said angular movement, said ratchet means being coupled to means for driving said input carrier from said periodically operable coupling means and means for controlling the effect of gravity on said output carrier whereby said carriers are each moved to maintain a predetermined input-output relationship based on the magnitude of sheets on said input carrier, said means for controlling the effect of gravity including means for unilaterally isolating the effect of the weight of said output carrier from said input-output control means.

25. In apparatus which includes means for processing sheets of paper and the like, means for controlling the delivery to and extraction of sheets from said processing means comprising a movable input carrier adapted to receive a pile of sheets and to render the same accessible to said processing means, a gravity driven movable output carrier adapted to receive the output of said processing means, a source of motive power, load sensing means comprising lever means angularly responsive to the work load of said apparatus, periodically operable coupling means pulsatingly energized by said source of power, input/output control means adapted to control the relative positions of said input and output carriers, said control means including a pivoted member one end of which is periodically displaced by said periodically operable coupling means and the other end of which is adapted to periodically engage said lever means except when said lever means has been angularly displaced a predetermined amount, said control means including ratchet means actuated when said lever means is so decoupled from said pivoted member due to said angular movement, said ratchet means being coupled to means for driving said input carrier from said periodically operable coupling means and means for controlling the effect of gravity on said output carrier whereby said carriers are each moved to maintain a predetermined input-output relationship based on the magnitude of sheets on said input carrier.

26. Apparatus for feeding, cutting, and stacking flat stock such as paper or the like, comprising, in combination, first movable supporting means upon which a plurality of flat articles may be piled, cutting means for cutting the articles into segments, apparatus for separating the articles adjacent the top of the pile, carrying means for individually removing the articles from the pile, conveying mechanism for receiving the articles from the carrying means and forwarding them to the cutting means, means for moving the first supporting means toward the carrying means, gravity-energized second movable supporting means for supporting the cut segments, control means interconnecting said means for moving said first supporting means and said second supporting means and adapted to move said second supporting means inversely with respect to said first supporting means, and apparatus comprising a laterally oscillatable member positioned transversely of the cut segments and longitudinally extending plates forming a series of open sections adapted to closely receive the respective cut segments.

27. Apparatus for feeding, cutting, and stacking flat stock such as paper or the like, comprising, in combination, first movable supporting means upon which a plurality of flat articles may be piled, cutting means for cutting the articles into segments, apparatus for separating the articles adjacent the top of the pile, carrying means for individually removing the articles from the pile, conveying mechanism for receiving the articles from the carrying means and forwarding them to the cutting means, means for moving the first supporting means toward the carrying means, second movable supporting means for supporting the cut segments, control means interconnecting said means for moving said first supporting means and said second supporting means and adapted to move said second supporting means inversely with respect to said first supporting means, said control means including means responsive to the height of said pile, and apparatus comprising a laterally oscillatable member positioned transversely of the cut segments and longitudinally extending plates forming a series of open sections adapted to closely receive the respective cut segments.

28. Apparatus for feeding, cutting, and stacking flat stock such as paper or the like, comprising, in combination, first movable supporting means upon which a plurality of flat articles may be piled, cutting means for cutting the articles into segments, apparatus for separating the articles adjacent the top of the pile, carrying means for individually removing the articles from the pile, said carrying means including means for displacing said articles vertically and means constrained to horizontal motion carried on said displacing means, conveying mechanism for receiving the articles from the carrying means and forwarding them to the cutting means, means for moving the first supporting means toward the carrying means, a second movable supporting means for supporting the cut segments, control means interconnecting said means for moving said first supporting means and said second supporting means and adapted to move said second supporting means inversely with respect to said first supporting means, and apparatus comprising a laterally oscillatable member positioned transversely of the cut segments and longitudinally extending plates forming a series of open sections adapted to closely receive the respective cut segments.

References Cited in the file of this patent

UNITED STATES PATENTS

| | | |
|---|---|---|
| 1,303,041 | Droitcour | May 6, 1919 |
| 1,560,015 | Broadmeyer | Nov. 3, 1925 |
| 1,792,693 | Johnson | Feb. 17, 1931 |
| 1,801,136 | Broadmeyer | Apr. 14, 1931 |
| 1,951,445 | Sauerman | Mar. 20, 1934 |
| 2,010,567 | Schwamb et al. | Aug. 6, 1935 |
| 2,156,419 | Zomnir | May 2, 1939 |
| 2,195,545 | Stobb | Apr. 2, 1940 |
| 2,347,254 | Cox | Apr. 25, 1944 |
| 2,424,093 | Harred | July 15, 1947 |
| 2,565,459 | Willet | Aug. 21, 1951 |
| 2,690,910 | Tuck | Oct. 5, 1954 |